RECORDING AND PLAYING DEVICE AND METHOD FOR SOUND RECORD

Filed Jan. 20, 1964

INVENTOR.
GYULA J. VARGA
BY B. T. Wobensmith 2nd
ATTORNEY

United States Patent Office 3,275,328
Patented Sept. 27, 1966

3,275,328

RECORDING AND PLAYING DEVICE AND METHOD FOR SOUND RECORD

Gyula J. Varga, 314 Locust Drive, Phoenixville, Pa. 19460

Filed Jan. 20, 1964, Ser. No. 338,656
8 Claims. (Cl. 274—20)

This invention relates to a sound record and a playing as well as a recording device therefor and more particularly to such record and recording and playing device for a short message. There has long been a need for a short message sound record and handling device which is simple and convenient. By "short" message is meant one of a few sentences or folios.

The present flexible sound records in wire or tape form are not convenient to use in short length message because the handling apparatus requires much greater lengths on the wind-up and unwinding spools. Tapes in various widths have possessed plural tracks for a magnetic type record and head, which adapts them for great lengths but there has been no handling device for only a short length of tape. In the early talking machine art with a vibrating needle, the sound records in either cylinder or disc type were not flexible usually, and not adapted for short plays. The circular disc type records also are incapable of utilizing the corners so that there is space in flat storage thereof which is not available for message storage.

It is the principal object of the present invention to provide improved sound recording record and apparatus for short messages.

It is a further object of the present invention to provide power driven sound records for short messages that require no excess length of record.

It is a further object of the present invention to provide simple but effective apparatus for sound recording on and play back from a flexible rectangular record sheet.

Other objects and advantageous features of the invention will be apparent from the description and claims.

The nature and characteristic features of the invention will be more readily understood from the following description taken in connection with the accompanying drawings forming part thereof, in which.

Figures 1, 2, 3, 4:
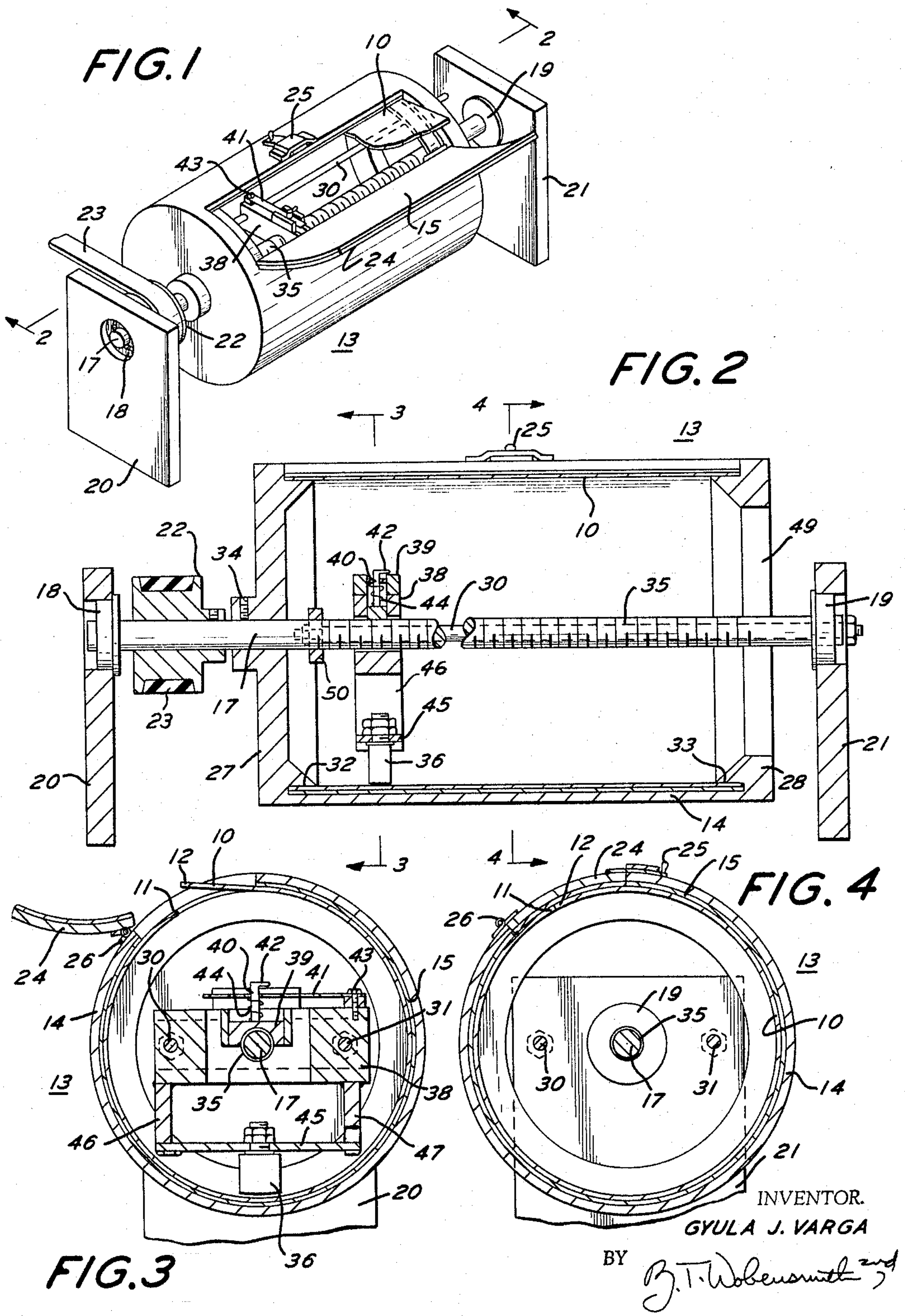
FIGURE 1 is a perspective view of the present short message record holder with part of the record broken away.
FIG. 2 is a vertical longitudinal sectional view taken on the line 2—2 of FIG. 1.
FIG. 3 is a transverse sectional view taken on the line 3—3 of FIG. 2.
FIG. 4 is a transverse sectional view taken on the line 4—4 and looking in an opposite direction to that for FIG. 3.

It should, of course, be understood that the description and drawings herein are illustrative merely, and that various modifications and changes can be made in the structure disclosed without departing from the spirit of the invention.

Like numerals refer to like parts throughout the several views.

In accordance with the invention a slightly stiff yet flexible sound record rectangular in flat condition is rolled into cylindrical form with its longitudinal edges abutting. It has been ascertained that a suitably mounted magnetic pick-up head may cross the abutting edges with almost no objectionable sound distortion and far less than occurs with a vibrating needle and upon removal and insertion with at least one side edge in a plane the message can be played back without substantial distortion or interruption at the abutting edges. The material of which the sound record is made, i.e., flexible synthetic plastic sheeting of Mylar or the like with a magnetic reactive coating or impregnation, is well known but has heretofore been used in elongated or tape form and not in rectangular sheets. The sound record material also will not have any bulging when properly mounted and supported.

A flexible sound record 10 of sheet material having a magnetic responsive coating or impregnation of well known type is employed, rectangular in form with abutting side edges 11 and 12.

A sound record carrying cylinder 13 is provided having cylindrical wall 14 which may be of metal or hard synthetic plastic with a liner 15 such as felt, or soft rubber or other yieldable and sound absorptive or sound deadening material next to cylinder wall 14. The record 10 is disposed along the wall 14 engaging the liner 15 and with its edges 11 and 12 abutting as hereinafter pointed out.

A rotatable shaft 17 is provided carried by bearings 18 and 19 in end supports 20 and 21. A pulley 22 driven by a belt 23 or other suitable drive effects rotation of the cylinder 13 and its shaft 17.

To facilitate insertion and removal of the sound record sheet 10, the cylinder 14 is preferably provided with a longitudinally hinged closure or door 24 (FIGS. 1 and 3) of arcuate contour of about 45° in angular extent. Any suitable type lock, latch, or catch 25 (FIGS. 1 and 2) holds door 24 in closed position for operation of a sound record 10. The hinges 26 of this door 23 are arranged longitudinally and outside the cylinder 13 so that the interior wall 14 is smooth and uninterrupted.

The cylinder 13 has a closed end wall 27 and an opposite open end wall 28 for the reception of a pair of stationary guide bars 30 and 31, referred to hereinafter, and also shown in FIGS. 3 and 4. As shown in FIG. 2 an annular recess 32 is provided at the junction of the end wall 27 and cylindrical wall 14 and a recess 33 is provided at the junction of the end wall 33 and the cylindrical wall 14 for snugly receiving the circular end edges of the sound record 10 and liner 15. At least one of these recesses 32 or 33 should have the ability to precisely position and hold one end edge of the record 10 so that the abutting edges 11 and 12 of the record 10 will be parallel and equally abut throughout such edges and will also be positioned so that each sound track end is alined with that in the abutting edges 11 and 12 upon reinsertion of the record 10.

The cylinder end wall 27 is provided with a set screw 34 for rotation of the cylinder 13 with the shaft 17. Between the end walls 27 and 28, shaft 17 is provided with screw threads 35 for the purpose of longitudinally moving a magnetic type pick-up and playback head 36 within the cylinder 13 during rotation thereof. While the pitch of the threads 35 can be selected as desired a pitch of the order of twenty, twenty eight or thirty two threads per inch has been found suitable in one embodiment with a length of threads of about five inches.

A carriage 38 is provided, movable along the guide bars 30 and 31, and, as shown in FIG. 3, a partial or half nut 39, engages the threads 35, the half nut 39 being slidably guided on the carriage 38 for limited vertical movement.

An upward projection or stem 40 from nut 39, is passed through a slot in a holding plate 41 and has at its upper end an extension 42 lying contiguous to the plate 41. The plate 41 is secured in position by a bolt 43 threaded into the carriage 38.

A coil spring 44 on the stem 40 engaging the half nut 39 and the plate 41 normally urges the half nut 39 into engagement with the threads 35.

By raising the stem 40 and extension 42 the nut 39 may be raised to be disengaged from the threads 35 with compression of the spring 44 while the nut 39 is manually held raised from thread engagement. This enables the carriage 38 to be slid for engagement with a sound track in another longitudinal portion of the cylinder 13.

The magnetic head 36 (FIGS. 2 and 3) is yieldably carried on the carriage 38, by a yieldable bridging support 45 extending between downward extensions 46 and 47 of the carriage 38.

The carriage 38 is movable along the guide bars 30 and 31 upon rotation of the shaft 17 with the half nut 39 engaging the threads 35.

The open end portion 49 of end wall 28 provides ample room for reception of the guide bars 30 and 31 from the end support 21 to this left in FIG. 2. A connecting spacer 50 carried on the shaft 17 holds the guide bars 30 and 31 in the correct lateral spacing and also holds these guide bars 30 and 31 in correct elevation with respect to the shaft 17.

The mounting of the record 10 as heretofore described obviates problems of compressive stresses since slight deformation of the record can be accommodated by the liner 15.

The manner of use will be clear from the foregoing with the head 36 connected to suitable energizing circuitry for input and to suitable playback devices for output from the record.

I claim:

1. In combination
a hollow rotatable cylinder having an inner cylindrical surface for the interior reception of a flexible sound record,
said cylinder having a longitudinally pivotal side wall door providing part of said inner cylindrical surface and through which the record may be inserted and withdrawn,
said cylinder having inner annular end recesses for positioning and holding the record,
a member for rotating said cylinder,
a magnetic pick-up head for said sound record,
a longitudinal guide in said cylinder along which said head is movable,
a threaded shaft coaxial with said cylinder, and
a member connected to said head and engaged with said shaft for translating said head in either direction.

2. The combination according to claim 1 in which said member is manually disengageable for longitudinally shifting said head along said guide.

3. The combination according to claim 1 in which said head has a yieldable mounting.

4. The combination with a hollow cylinder for holding a flexible sound record on an inner periphery of said cylinder, a member for rotating said cylinder, a magnetic pick-up head for said sound record, a longitudinal guide along which said head is moved, a threaded shaft coaxial with said cylinder, a partial nut engaged with the threads of said shaft during rotation of said cylinder for translating said head, and a yieldable member for holding said partial nut in engagement with said threaded shaft, said cylinder being provided with at least partial end walls at least one of which forms a peripheral recess for positioning a record to have its longitudinal edges abutting one another contiguous an inner periphery of said cylinder, said longitudinal guide including a pair of bars along which said head is translated and supported by a carriage, said yieldable member being a helical spring around an extension from said partial nut and in engagement with said nut and with a projection from said carriage, said projection including a removable plate, said head being supported on a yieldable strip spaced from said carriage contiguous an inner surface of said record, a yieldable and sound deadening liner being provided between a record and a radially inner surface of said cylinder.

5. A combination according to claim 4 in which said cylinder is provided with a longitudinally pivoted door having an inner arcuate surface continuous with the remaining interior cylindrical portions of said cylinder.

6. A combination according to claim 5 in which said door has its hinges on an outside of said cylinder.

7. A device in which a short message sound record may be held for recording and reproduction, said device including a hollow cylinder rotatable on a shaft supported between bearings, a driving means connected to said shaft, a flexible magnetic activated sound record sheet insertable within and removable from said cylinder contiguous an inner surface of a wall of said cylinder, a member for holding said record sheet in position in said cylinder with its longitudinal edges substantially abutting, a magnetic type head held contiguous an inner surface of said cylinder and movable longitudinally therein with rotation of said cylinder, said shaft being threaded within the cylinder, a pair of guide bars, a carriage slidable on said guide bars for supporting said head for longitudinal movement in said cylinder, a pair of projections from said carriage, a yieldable bridge between said projections and on which said head is carried, a partial nut on said carriage engaging said threaded shaft, and means whereby said nut may be disengaged from the threads of said shaft for longitudinally adjusting said head with respect to a record, said last mentioned means including a plate carried by said carriage, a projection from said nut extending through said plate, and a helical spring on said projection engaging said nut and plate whereby on compressing said helical spring manually said nut may be disengaged from the shaft threads, the carriage and head moved longitudinally to another portion of a sound record and the nut reengaged with said threads on release of the helical spring from its stress.

8. A method of mounting a short message type flexible sound record for recording or playing, said method including bending said record around substantially 360° on the inside of a cylindrical form on which said record is held while guiding opposite surfaces of its end edges against becoming out of round, and then applying at least a slight compressive stress transversely of the rounded record by bringing the longitudinal edges of a rounded record and contacting such longitudinal edges into abutting relation, whereby any tendency of the record to bulge outwardly is precluded by said cylindrical form.

References Cited by the Examiner

UNITED STATES PATENTS

| | | | |
|---|---|---|---|
| 1,409,304 | 3/1922 | Loomis | 346—138 |
| 2,233,915 | 3/1941 | Conrad | 274—20 |
| 2,919,136 | 12/1959 | Fritzinger | 274—17 |
| 2,976,108 | 3/1961 | Johnson | 346—138 X |

NORTON ANSHER, *Primary Examiner.*

C. B. PRICE, *Assistant Examiner.*